US011528163B2

(12) United States Patent
Tokunaga et al.

(10) Patent No.: US 11,528,163 B2
(45) Date of Patent: Dec. 13, 2022

(54) COMMUNICATION SYSTEM

(71) Applicant: DENSO CORPORATION, Kariya (JP)

(72) Inventors: Tomoya Tokunaga, Kariya (JP); Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 17 days.

(21) Appl. No.: 17/172,221

(22) Filed: Feb. 10, 2021

(65) Prior Publication Data
US 2021/0258186 A1 Aug. 19, 2021

(30) Foreign Application Priority Data

Feb. 14, 2020 (JP) .............................. JP2020-023632

(51) Int. Cl.
*H04L 12/40* (2006.01)
*H04L 12/12* (2006.01)

(52) U.S. Cl.
CPC ........ *H04L 12/40039* (2013.01); *H04L 12/12* (2013.01); *H04L 2012/40215* (2013.01); *H04L 2012/40273* (2013.01)

(58) Field of Classification Search
CPC ............... H04L 12/40039; H04L 12/12; H04L 2012/40215; H04L 2012/40273
See application file for complete search history.

(56) References Cited

U.S. PATENT DOCUMENTS

| 6,157,818 | A * | 12/2000 | Rode | H04W 8/26 455/500 |
| 6,799,233 | B1 * | 9/2004 | Deshpande | G06F 13/4291 710/110 |
| 2002/0023237 | A1 * | 2/2002 | Yamada | G06F 1/3209 713/323 |
| 2005/0204204 | A1 | 9/2005 | Muth | |
| 2006/0075086 | A1 | 4/2006 | Muth | |
| 2013/0103959 | A1 * | 4/2013 | Hatta | H04L 12/12 713/300 |
| 2013/0326255 | A1 * | 12/2013 | Kodama | G06F 1/32 713/323 |
| 2014/0047255 | A1 * | 2/2014 | Sasaki | H04L 12/40 713/323 |
| 2017/0265046 | A1 * | 9/2017 | Chen | H04W 12/50 |

FOREIGN PATENT DOCUMENTS

JP 2005-529517 A 9/2005

\* cited by examiner

*Primary Examiner* — Rasheed Gidado
(74) *Attorney, Agent, or Firm* — Harness, Dickey & Pierce, P.L.C.

(57) ABSTRACT

A communication system, in which a plurality of nodes communicate with each other according to a communication protocol, which wakes up some of the plurality of nodes when a communication frame containing specific start information occurs on or is transmitted to the communication bus, includes a master node determines, for each of slave nodes, a start condition, which is a condition for transition of a subject node from a sleep state to a normal state. The master node transmits, to the communication bus, the determined start condition tailored for each of the slave nodes for a reception thereof by each of the slave nodes.

8 Claims, 8 Drawing Sheets

FIG. 2

| NODE 1 | NODE 2 | NODE 3 | APP1 | APP2 | APP3 | START CONDITION |
|---|---|---|---|---|---|---|
| × | × |  |  |  |  | TABLE 1 |
| × | × | × |  |  |  | TABLE 2 |
| × | × |  | × |  |  | TABLE 3 |
|  |  |  |  |  |  |  |
| OTHER |  |  |  |  |  | NO SETTING |

FIG. 3

| CONDITION | CONDITION 1 | CONDITION 2 | CONDITION 3 | |
|---|---|---|---|---|
| NODE 1 | ○ | ○ | ○ | |
| NODE 2 |  |  | ○ | |
| NODE 3 |  | ○ |  | |
|  |  |  |  | |

COMMUNICATION SYSTEM

CROSS REFERENCE TO RELATED APPLICATION

The present application is based on and claims the benefit of priority of Japanese Patent Application No. 2020-023632, filed on Feb. 14, 2020, the disclosure of which is incorporated herein by reference.

TECHNICAL HELD

The present disclosure generally relates to communication systems.

BACKGROUND INFORMATION

A plurality of communication devices mounted on the vehicle communicate according to communication protocols such as CAN (registered trademark) and LIN to construct a communication system. For example, CAN defines a selective wakeup function for selectively waking up some of nodes among a plurality of communication devices connected to a communication bus with which communication is required. As a result, a partial network is realized in which some nodes connected to the communication bus communicate with each other in a wake-up state.

SUMMARY

It is an object of the present disclosure to provide a communication system in which start condition(s) can be easily changed.

BRIEF DESCRIPTION OF THE DRAWINGS

Objects, features, and advantages of the present disclosure will become more apparent from the following detailed description made with reference to the accompanying drawings, in which:

FIG. 2 is an example of an allocation table;

FIG. 3 is an example of a start condition table;

DETAILED DESCRIPTION

Figure 1:
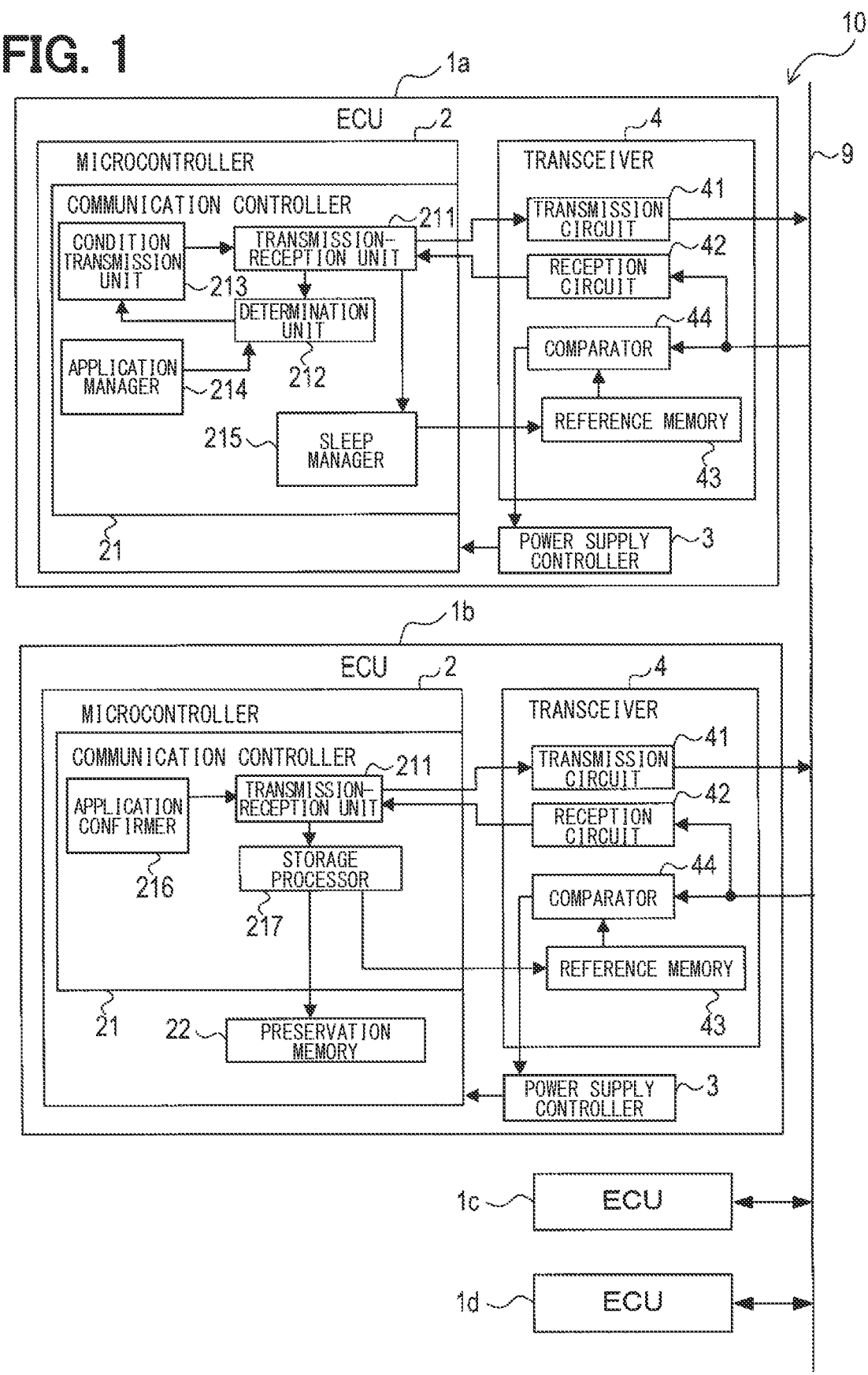
FIG. 1 is a block diagram showing a configuration of a communication system according to a first embodiment.

Hereinafter, exemplary embodiments of the present disclosure are described with reference to the drawings.

1. First Embodiment

[1-1. Overall Configuration]

A communication system 10 shown in FIG. 1 includes a plurality of electronic control devices (hereinafter referred to as "ECUs") 1a, 1b, 1c, 1d (hereinafter, also referred to collectively as ECU 1 when individual ECUs are not distinguished) mounted on a vehicle. The plurality of ECUs 1 are connected to a communication bus 9 to constitute an in-vehicle network, and perform mutual communication according to a CAN protocol via the communication bus 9. That is, in the communication system 10, each of the plurality of ECUs 1 functions as a node, that is, serves a communication device. Hereinafter, the ECUs 1a, 1b, 1c, and 1d are also referred to as nodes 1a, 1b, 1c, and 1d (hereinafter, also referred to collectively as node 1 when individual nodes are not distinguished).

Each ECU 1 has, i.e., operates in, a plurality of states including a normal state in which communication processing is executed and a sleep state in which communication processing is stopped to reduce power consumption. The communication system 10 of the present embodiment reduces the power consumption of the communication system 10 as a whole by realizing a partial network in which some ECUs 1 connected to the communication bus 9 communicate in a wake-up state.

In the communication system 10 of the present embodiment, each ECU 1 can receive at least NM (network management) frames even in the sleep state. The NM frame is a frame for exchanging data for network management. Examples of the NM frame include a frame for transitioning an ECU 1 from the sleep state to the normal state, that is, to wake up the ECU 1, and a frame for indicating whether or not a predetermined sleep condition is satisfied for the subject node. The predetermined sleep condition is set for each ECU 1, such as when an accessory switch is turned off and a predetermined time or more has elapsed. The NM frame for indicating whether or not the sleep condition is satisfied for the subject node is transmitted by (i.e., out from) each of the ECUs 1 at a predetermined fixed cycle, for example. When the sleep conditions are satisfied for all the ECUs 1 constituting the communication system 10, each ECU 1 transitions to a sleep permitted state, which is described later, and then to the sleep state. In summary, possible states include:

(i) a normal state (awake), with a clock circuit operating; transition into the normal state when power is started; and/or transition into the normal state when a sleep condition is not satisfied;

(ii) a sleep prohibited state, when a sleep condition is not satisfied;

(iii) a sleep permitted state, that transitions to a sleep state after a lapse of time; and (iv) a sleep state; transition into the sleep state when power supply to the microcontroller is lost; the clock circuit may be turned OFF in the sleep state; and a sub clock may remain ON (or be turned ON) in the sleep state.

[1-2. Master ECU Configuration]

Of the ECUs 1, a configuration of the ECU 1a, which is a master ECU, is described with reference to FIG. 1. The ECU 1a includes a microcomputer 2 or a microprocessor 2 that executes control processing of each part of the vehicle and communication processing with other ECUs 1, a power supply controller 3, and a transceiver 4 that mediates, for example, communication between the microcontroller 2 and the communication bus 9, which is an interface IC.

The microcontroller 2 includes a communication controller 21 in addition to a well-known configuration (not shown) including a CPU, ROM, RAM, IO port, and the like. The communication controller 21 includes a transmission-reception unit 211, a determination unit 212, a condition transmission unit 213, an application manager 214, and a sleep manager 215.

The transmission-reception unit 211 executes communication processing according to the CAN protocol, for example, frame transmission/reception, arbitration control, communication error processing, and the like. The transmission-reception unit 211 outputs a low-level or high-level transmission signal to the transceiver 4, and inputs, from the transceiver 4, a low-level or high-level reception signal representing the content of the bus signal input from the communication bus 9.

When the determination unit 212 determines that at least one of the ECU 1 constituting the communication system 10 and the application executed by the communication system 10 has changed, the determination unit 212 is configured to NEWLY determine, each of the plurality of ECUs 1, a start condition for transitioning from the sleep state to the normal state. In the present embodiment, the determination unit 212 determines that the ECU 1 constituting the communication system 10 has changed when a connection status of the ECU 1 constituting the communication system 10 changes. For example, when a new ECU 1 is connected to the communication system 10 and the number of ECUs 1 constituting the communication system 10 increases, or when, though the number of ECUs 1 constituting the communication system 10 does not change, an existing ECU 1 is replaced with a new ECU 1, or the like, the determination unit 212 determines that the ECU 1 constituting the communication system 10 has changed.

The determination unit 212 determines a start condition for each of the plurality of ECUs 1 by using an allocation table and a start condition table. Specifically, the determination unit 212 uses a plurality of allocation tables held in advance and one start condition table allocated by the allocation table among the plurality of start condition tables held in advance for a determination of a start condition for each of the ECUs 1.

The allocation table is a table for associating (i) a combination of the ECU 1 connected to the communication bus 9 and the application to be executed with (ii) a start condition table. More specifically, the allocation table is designed to associate (i) a combination of a node ID of an ECU 1 connected to the communication bus 9 and an application ID of an application to be executed with (ii) the start condition table to be allocated thereto. The node ID is a unique ID assigned to each node. The application ID is a unique ID assigned to each application. Version information described later may be added to the application ID.

The start condition table is a table for associating each of the plurality of ECUs 1 with the conditions for waking up relevant one or more of the plurality of ECUs 1. More specifically, the start condition table is designed to associate a node ID with a start condition or conditions.

The allocation table in the present embodiment is described with reference to FIG. 2. For convenience, a node ID is described as "node n" and an application ID is described as "APPn". A number from 1 to 3 is substituted with the "n." For the ECU 1 connected to the communication bus 9, "x" is attached to "node n". For the application to be executed, "x" is indicated in the table of FIG. 2 in a column of "APPn." For example, when the ECU 1 connected to the communication bus 9 is a "node 1" and a "node 2," and an "APP1" is executed thereby, a start condition table "table 3" defining the start condition of those nodes is assigned thereto. If the combination of (i) the ECU 1 connected to the communication bus 9 and (ii) the application to be executed does not match any of the combinations described in the allocation table, "no setting" is set. The allocation table of FIG. 2 is just an example of a combination of the ECU 1 connected to the communication bus 9 and the application to be executed, and such a combination may also be other combinations of other node IDs and application IDs or the like.

Subsequently, the start condition table in the present embodiment is described with reference to FIG. 3. The start condition table in FIG. 3 may be, for example, start condition table 2, because the allocation table of FIG. 2 indicates start condition table 2 in the second row (when nodes 1, 2, and 3 are present, and no Applications are present). In FIG. 3, "node 1" is specified to wake up on at least one of "Condition 1," "Condition 2" and "Condition 3." Further, "node 2" is specified to wake up on "Condition 3." Further, "node 3" is specified to wake up on "Condition 2." In other words, "Condition 1" stipulates that "Node 1" wakes up. Further, "Condition 2" stipulates that "Node 1" and "Node 3" wake up. Further, "Condition 3" stipulates that "Node 1" and "Node 2" wake up. That is, from the start condition table, a group of ECUs 1 to wake up at the same time can be known. Note that, for example, "Condition 1" indicates that a vehicle is parked, "Condition 2" indicates that an EV is being charged, and "Condition 3" indicates that an ignition switch is on. The start condition table of FIG. 3 is an example of a combination of each of the plurality of ECUs 1 and a condition for waking up one or more of the ECUs 1, which may be other combination(s) for other node IDs and conditions.

Returning to FIG. 1, the determination unit 212 outputs the start condition determined for each ECU 1. In the present embodiment, the determination unit 212 outputs a start condition table in which the start conditions determined for each of the ECUs 1 are listed.

The condition transmission unit 213 is configured to transmit the start condition determined by the determination unit 212 to the transceiver 4 via the transmission-reception unit 211. In the present embodiment, the condition transmission unit 213 sets the start condition in a data field of a communication frame based on the start condition table. Taking the start condition table shown in FIG. 3 as an example, values set in the data fields are described. For example, assuming that (i) when wake-up is performed when "Condition 1" is satisfied, 1 is set in a 6th bit of the data field, and (ii) when wake-up is performed when "Condition 2" is satisfied, 1 is set in a 4th bit of the data field, and (iii) when wake-up is performed when "Condition 3" is satisfied, 1 is set in a second bit of the data field, the condition transmitter 213 sets relevant condition setting values corresponding to the start condition, such as 0x2A for "node 1" and 0x02 for "node 2" and 0x08 for "node 3." The condition transmission unit 213 transmits a communication frame so that each ECU 1 receives a start condition corresponding to each ECU 1.

Returning to FIG. 1, the application manager 214 determines whether or not an application or applications executed on the subject node has been added or changed. In the present embodiment, the application manager 214 compares (A) an application list held in advance by the application manager 214 and (B) a latest application list acquired from a storage area other than the storage area of the communication controller 21 and not shown in the drawing, and determines that the application(s) has/have been added or changed when it is determined that there is a difference therebetween. The application list is a list of version information indicating (i) the application ID and the application version assigned to the respective applications executed on the subject node. The latest application list is updated when software is updated by, for example, OTA. In the latest application list, an application ID is added when an application is added thereto, and the version information of an application is updated when the application is changed. Further, the application list held in advance by the application manager 214 is updated to the latest application list as appropriate after it is determined that the application has been added or changed. As a result, the application manager 214 can avoid repeatedly determining that the same application has been added or changed. OTA is an abbreviation for "Over The Air."

The sleep manager 215 determines whether or not the subject node can transition to the sleep permitted state in which the transition to the sleep state is permitted. When the sleep manager 215 determines that the subject node can transition to the sleep permitted state, the sleep manager 215 transitions the subject node to the sleep permitted state. In the present embodiment, when the sleep manager 215 receives an NM frame indicating that the sleep condition is satisfied from all the ECUs 1, it determines that the subject node or nodes can transition to the sleep permitted state. On the other hand, when the sleep manager 215 receives an NM frame from at least one of the ECUs 1 constituting the communication system 10 to the effect that the sleep condition is not satisfied, the sleep manager 215 determines that the relevant ECU(s) 1 is/are in a sleep prohibited state.

When the subject node transitions from the sleep prohibited state to the sleep permitted state, the sleep manager 215 stores/memorizes a value indicating failure (hereafter also designated as a fail value), which is a value that enables transition of the subject node from the sleep state to the normal state in the reference memory 43 as a start condition upon receiving an NM frame containing arbitrary start information before the subject node actually transitions to the sleep state, so that the subject node receives the NM frame. More specifically, the sleep manager 215 stores a fail value (i.e., a value indicating failure) in the reference memory 43 to wake up a relevant node when the dominant is received thereby. Note that the ECU 1 transitions to the sleep state after a lapse of a predetermined time after the transition to the sleep permitted state.

Further, the microcontroller 2 includes a clock circuit (not shown) that generates an operation clock for the CPU to operate, and when the power supply to the clock circuit is stopped, the operation of the clock circuit, and eventually the operation of the CPU itself is stopped. The above-mentioned normal state is a state in which the clock circuit of the microcontroller 2 is operating, and the sleep state is a state in which the clock circuit of the microcontroller 2 is stopped. Note that, if the clock circuit includes a main clock circuit and a sub clock circuit that consumes less power than the main clock circuit, operation scheme of those clocks may be that the main clock circuit is operated in the normal state, and the sub clock circuit is operated in the sleep state in place of the main clock circuit.

The power supply controller 3 controls a power supply to the microcontroller 2. When the power supply to the microcontroller 2 is interrupted, the ECU 1a transitions to the sleep state, and when the power supply to the microcontroller 2 is started, the ECU 1a transitions to the normal state, that is, wakes up.

The transceiver 4 includes a transmission circuit 41, a reception circuit 42, the reference memory 43, and a comparison circuit 44. The transmission circuit 41 converts a transmission signal indicating a logical value input from the microcontroller 2 into a bus signal transmitted/received via the communication bus 9, and outputs the bus signal to the communication bus 9. More specifically, when the transmission circuit 41 inputs a high-level transmission signal representing "1" from the microcontroller 2, the transmission circuit 41 outputs a bus signal representing "recessive" to the communication bus 9, and outputs a bus signal representing "dominant" to the communication bus 9 when receiving an input of a low-level transmission signal representing "0" from the microcontroller 2.

The reception circuit 42 converts the bus signal input from the communication bus 9 into a reception signal indicating a logical value, and outputs the reception signal to the microcontroller 2. More specifically, when the reception circuit 42 inputs a bus signal representing "recessive" from the communication bus 9, the reception circuit 42 outputs a high-level reception signal representing "1" to the microcontroller 2, and when receiving an input of a bus signal representing "dominant" from the communication bus 9, the reception circuit 42 outputs a low-level reception signal representing "0" to the microcontroller 2.

The reference memory 43 is a register that stores the start condition of the subject node. The subject node may be a master node or a slave node. The comparison circuit 44 compares the start information included in the NM frame generated in the communication bus 9 in the sleep state with the start condition written in the reference memory 43, bit by bit (with different bits representing different start conditions, see line 1 of FIG. 3). Then, when the start condition (wake condition) is satisfied, the comparison circuit 44 outputs, to the power supply controller 3, a power supply signal for causing the power supply controller 3 to supply electric power to the microcontroller 2. In the present embodiment, the comparison circuit 44 determines that a wake up condition is satisfied when any one of bit-by-bit logical products of (a) the start information included in the NM frame input from the communication bus 9 in the sleep state and (b) the start condition written in the reference memory 43 is TRUE. For example, when (i) a condition setting value of 0x2A is set as a start condition in the reference memory 43, and (ii) at least one of the second bit, the fourth bit, and the sixth bit is set as "1" as the start information in the NM frame input from the communication bus 9 in the sleep state, the comparison circuit 44 outputs a power supply signal assuming that the wake up condition is satisfied. As a result, as described above, the ECU 1 transitions from the sleep state to the normal state, that is, wakes up. In the present embodiment, since a fail value (i.e., a value indicating failure) is stored in the reference memory 43 of the ECU 1a, the wake up condition is satisfied if the comparison circuit 44 receives "dominant" regardless of which one of the bits is "dominant."

[1-3. Slave ECU Configuration]

Among the ECUs 1, the configuration of the ECU 1b, which is a slave ECU, is described with reference to FIG. 1.

The ECU 1b includes a microcontroller 2, a power supply controller 3, and a transceiver 4. The configuration of the power supply controller 3 and the transceiver 4 is the same as that of the ECU 1a. The microcontroller 2 includes a communication controller 21 and a preservation memory 22 in addition to a well-known configuration (not shown) including a CPU, ROM, RAM, IO port, and the like.

The communication controller 21 includes a transmission-reception unit 211, an application confirmer 216, and a storage processor 217. The configuration of the transmission-reception unit 211 is the same as that of the ECU 1a. Similar to the application manager 214 of the ECU 1a, the application confirmer 216 determines whether or not the application executed on the subject node has been added or changed. When the application confirmer 216 determines that the application has been added or changed, the application confirmer 216 outputs an application ID of the relevant application determined to have been added or changed to the transceiver 4 via the transmission-reception unit 211.

The storage processor 217 stores the start condition transmitted from the master ECU 1a in the preservation memory 22 before storing the start condition in the reference memory 43. Then, when the subject node transitions from the sleep prohibited state to the sleep permitted state, the storage processor 217 stores, in the reference memory 43, the start condition stored in the preservation memory 22 before the subject node actually transitions to the sleep state. The storage processor 217 determines whether or not the subject node can transition to the sleep permitted state, similarly to the sleep manager 215 of the ECU 1a. Then, when the storage processor 217 determines that the subject node can transition to the sleep permitted state, the storage processor 217 lets the subject node transition to the sleep permitted state.

The preservation memory 22 is a non-volatile memory in which data can be written and rewritten. The preservation memory 22 stores the start condition of the subject node. Note that additional slave nodes (the ECU 1c and the ECU 1d) have the same configuration as the first slave node (ECU 1b).

[1-4. Processing]
[1-4-1. When the ECU 1 in the Communication System 10 Changes]

Figure 4:
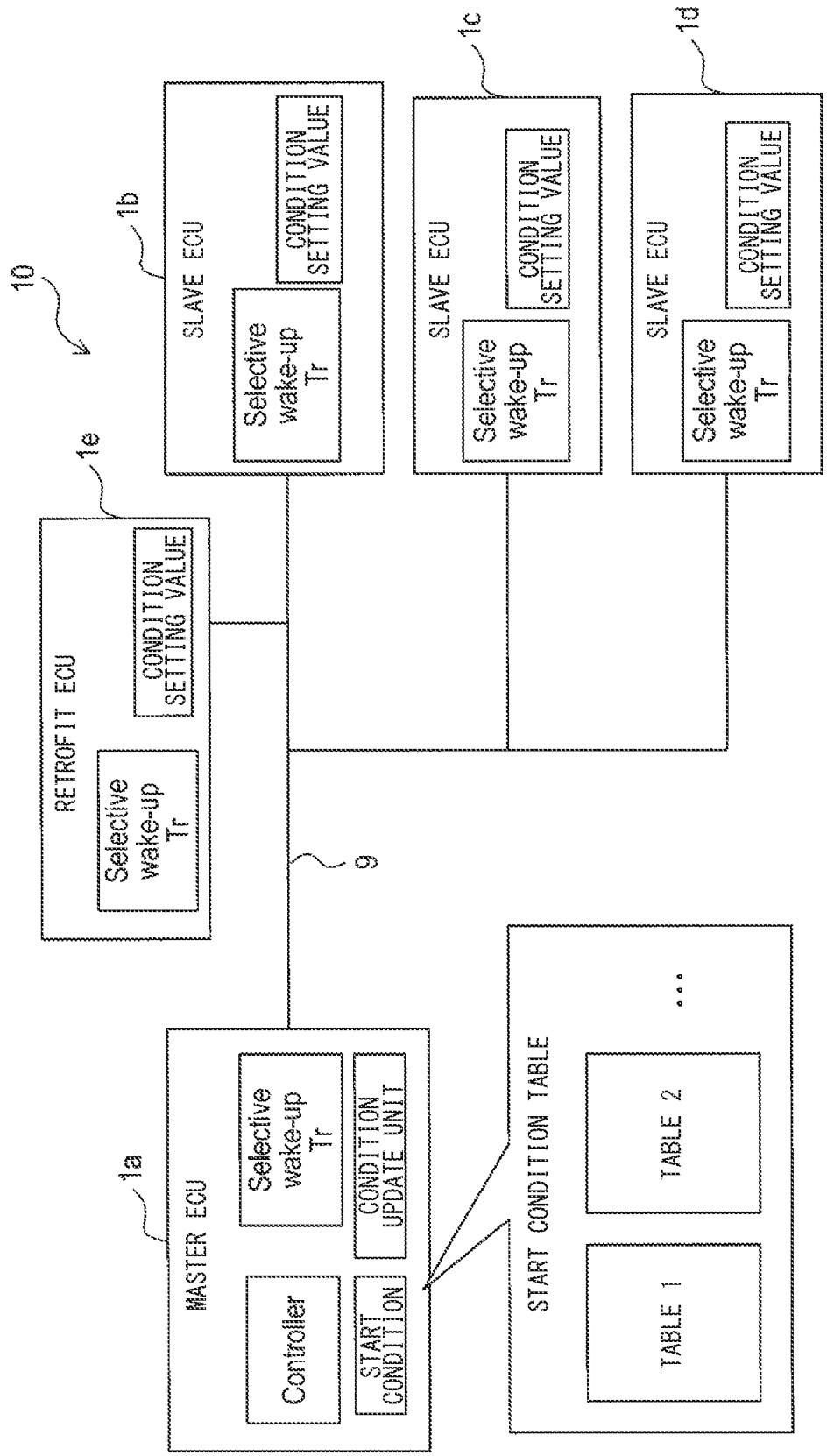
FIG. 4 is a schematic diagram showing a configuration of a communication system according to the first embodiment.

A process when a retrofit ECU 1e is newly connected to the communication bus 9 as shown in FIG. 4 is described with reference to the sequence diagram of FIG. 5. The retrofit ECU 1e has the same configuration as the ECUs 1b to 1d. Hereinafter, the retrofit ECU 1e may also be referred to as an ECU 1e (or as an added slave node).

[1-4-1-1. Transition to Sleep State]

First, in S1, the retrofit ECU 1e transmits a specific frame immediately when it is newly connected to the communication bus 9. In the present embodiment, the specific frame is a frame including: (a) authentication information and (b) a node ID (and optionally including an application ID). The specific frame transmitted in this example includes the authentication information and the node ID. The authentication information is information for device authentication, and is used for determining whether or not the newly connected ECU 1 is a valid ECU 1 for which connection is permitted. In the present embodiment, a MAC address assigned to each ECU 1 is set in the specific frame as the authentication information. That is, the retrofit ECU 1e transmits a specific frame including a MAC address assigned to the retrofit ECU 1e and the node ID of the subject node.

Subsequently in S2, the ECU 1a determines whether or not the retrofit ECU 1e is a valid ECU 1, connection of which is permitted based on the authentication information included in the received specific frame. In the present embodiment, the ECU 1a determines whether or not the retrofit ECU 1e is a valid ECU 1 whose connection is permitted based on a connection permission list held in advance and the MAC address included in the received specific frame. The connection permission list is a list of MAC addresses assigned to valid ECUs 1 to which connection is permitted. More specifically, if the connection permission list contains the MAC address included in the received specific frame, the ECU 1a determines that the retrofit ECU 1e is a valid ECU 1 for which connection is permitted.

Subsequently in S3, when the ECU 1a determines that the retrofit ECU 1e is a valid ECU 1 whose connection is permitted, the ECU 1a determines, for each of the plurality of ECUs constituting the communication system 10, the start condition are determined for each of the plurality of ECUs 1 constituting the communication system 10, and transmits, to each of the plurality of ECUs 1, the determined start condition relevant to the respective ECUs 1 for the reception thereby. The node ID included in the received specific frame is used when referring to the allocation table.

Subsequently, the ECUs 1b to 1d respectively store the start condition transmitted from the ECU 1a in a (respective preservation) memory. Further, the retrofit ECU 1e also stores the start condition transmitted from the ECU 1a in a (respective preservation) memory. The memories referred to above are respective preservation memories 22.

Subsequently in S5, the ECUs 1a to 1e respectively determine whether or not the subject node can transition to the sleep permitted state. When the ECUs 1a to 1e determine that the subject node can transition to the sleep permitted state, the ECUs 1a to 1e shift the subject node to the sleep permitted state in S6.

Subsequently in S7, the ECUs 1a to 1d and the retrofit ECU 1e store the start condition in the registers of the transceiver 4. At this time, the ECU 1a stores the fail value in the register as a start condition. The ECUs 1b to 1d store, in the register, the start condition stored in the memory in S4. Note that the register referred to here is the reference memory 43.

Subsequently in S8, the ECUs 1a to 1d and the retrofit ECU 1e respectively transition to the sleep state.

[1-4-1-2. Transition to Normal State, Optionally Caused by Signal from Switch]

Subsequently, although not shown in the drawings, an example is described in which a single node is directly wired to the ignition switch, and transitions from the sleep state to the normal state (without receiving a frame). Let us call this a switch induced transition, in contrast to the frame induced transitions discussed above.

Specifically, (not shown in drawings), the ECU 1b is set, according to the microcontroller 2, to acquire a signal of an ignition switch via a wire directly connecting the ECU 1b and the ignition switch, and to (switch induced) transition from the sleep state to the normal state when the acquired signal becomes active. Further, it is assumed that the other ECU 1 is not connected to the ignition switch, such that they are not awakened by the signal of the ignition switch.

In this case, when the ECU 1b transitions from the sleep state to the normal state by activation of the signal (switch induced transitions), the ECU 1b then transmits an NM frame including specific start information, for relevant ECUs 1 to wake up while the ignition switch is on, after the ECU 1b wakes up. More specifically, in an example far above, it corresponds to a case of wake-up when "Condition 3" is satisfied. Thus, the ECU 1b sets 1 in the second bit of the data field, that is, the ECU 1b transmits an NM frame in which 0x02 is set as the start information. As a result, the ECU 1 belonging to a group that wakes up when "Condition 3" is satisfied (frame induced transition), like the ECU 1b; can transition from the sleep state to the normal state. On the other hand, the other ECU 1 belonging to another group that does not need to wake up when the "Condition 3" is satisfied remains in the sleep state.

[1-4-2. When the Application Executed by the Communication System 10 Changes]

Subsequently, although not shown in the drawing, a process when the application executed by the communication system 10 changes is described.

For example, when a new application is added to the ECU 1b or the application of the ECU 1b is changed, the ECU 1b immediately transmits a specific frame. The specific frame transmitted in this example includes the authentication information and the application ID. In addition, version information may be added to the application ID.

Subsequently, the ECU 1a determines whether or not the ECU 1b is a valid ECU 1 for which connection is permitted, based on the authentication information included in the received specific frame. Subsequently, the ECU 1a determines start conditions for each of the ECUs 1 constituting the communication system 10, and transmits the determined start condition so that each of the plurality of ECUs 1 receives the respective determined start condition. The application ID included in the received specific frame is used when referring to the allocation table.

Figure 5:
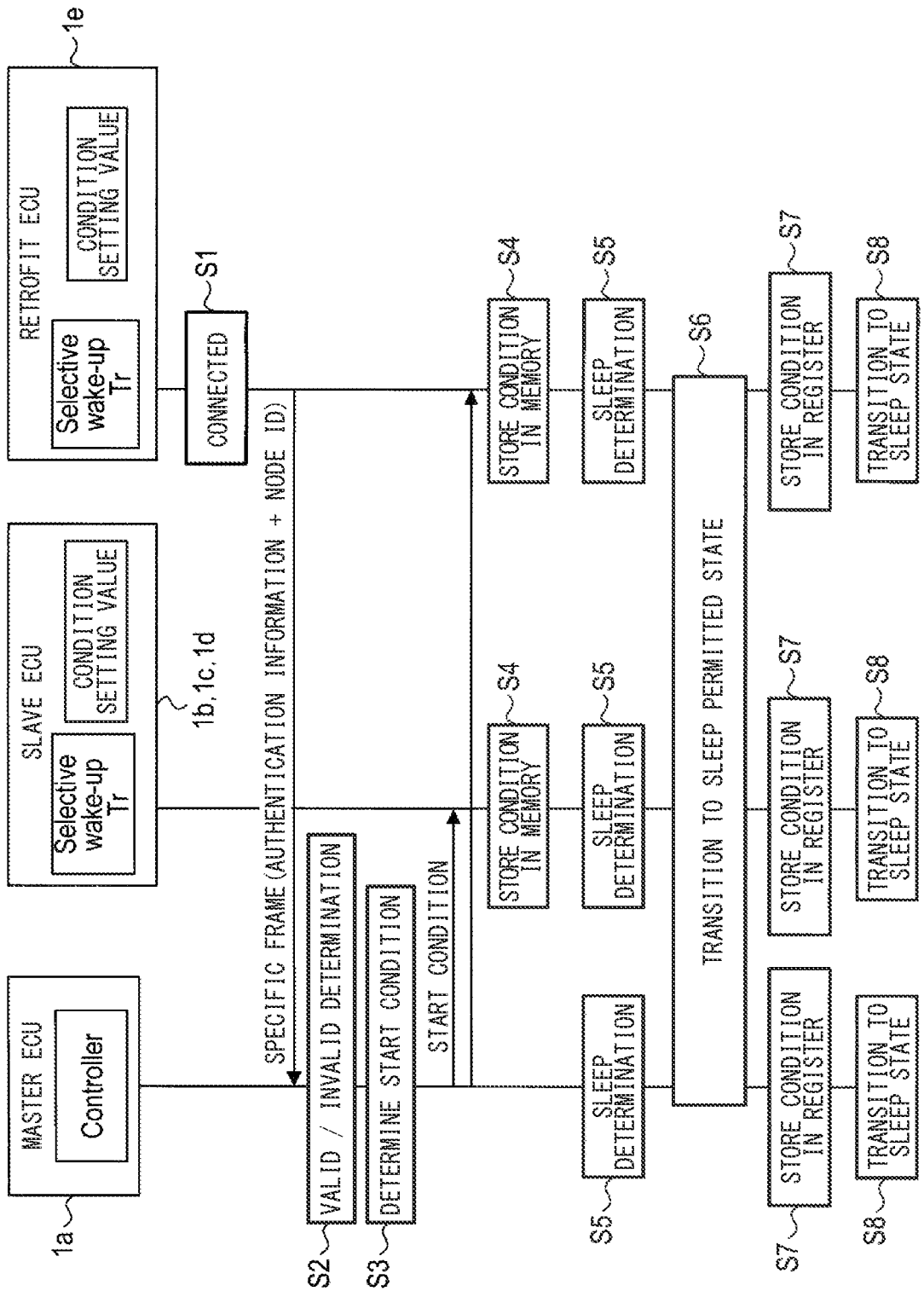
FIG. 5 is a sequence diagram of a situation when a new node is connected to a communication bus.

Subsequent processing is the same as S4 to S8 in FIG. 5.

[1-4-3. Master Process, FIG. 6]

Figure 6:
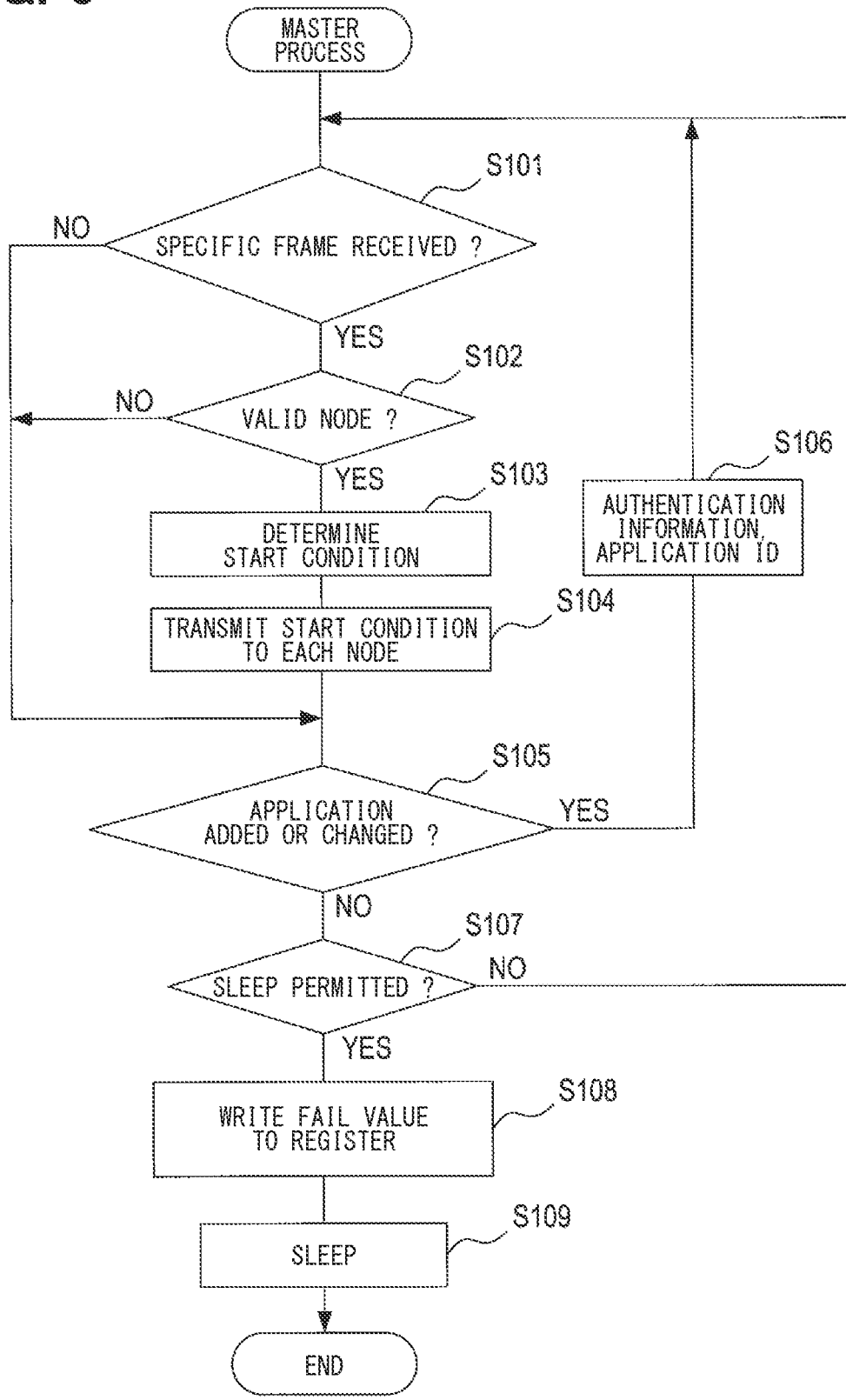
FIG. 6 is a flowchart of a master process.

Subsequently, a master process executed by the controller 21 of the ECU 1a is described with reference to a flowchart of FIG. 6. The master process is started when a predetermined start condition is satisfied. In the present embodiment, the master process is started when any of the following two start condition is satisfied (not shown in FIG. 3). The first is when the power supply of the ECU 1a is turned on. The second is when the ECU 1a wakes up. Additionally, the master process is repeatedly executed at a predetermined cycle while the ECU 1a is in the normal state after the start. In such manner, for example, even when a plurality of nodes are newly connected, the controller 21 can determine the start condition and transmit the determined start condition each time that a new node is connected.

First, in S101, the controller 21 determines whether or not a specific frame has been received. When the controller 21 determines that a specific frame has been received in S101, the controller 21 proceeds to S102 and determines whether the node 1 that has transmitted the specific frame is a valid node 1 based on the authentication information included in the specific frame.

When the controller 21 determines in S102 that the node 1 that has transmitted the specific frame is a valid node 1, the controller 21 proceeds to S103 and determines the respective start condition for each of the plurality of every node 1. In addition, S103 corresponds to the processing as the determination unit 212.

Subsequently, in S104, the controller 21 transmits the determined start condition tailored for each of the plurality of nodes so that each of the plurality of nodes 1 receives the relevant start condition determined for each of the plurality of nodes 1. After that, the controller 21 proceeds to S105. Note that S104 corresponds to the processing as the condition transmission unit 213.

The controller 21 also proceeds to S105 when it is determined in S101 that the specific frame has not been received. The controller 21 also proceeds to S105 when it is determined in S102 that the node 1 that has transmitted the specific frame is not a valid node 1.

In S105, the controller 21 determines whether or not there is a newly added application or a changed application in the ECU 1a. When the controller 21 determines in S105 that there is a newly added application or a changed application in the ECU 1a, the controller 21 proceeds to S106 and transmits a specific frame including (a) authentication information of the subject node and (b) the application ID of the newly-added or changed application, and then returns the process to S101 for repeating the master process. Note that S105 and S106 correspond to processing by the application manager 214.

On the other hand, when the controller 21 determines in S105 that there are no newly added applications or changed applications in the ECU 1a, the controller 21 proceeds to S107 and determines whether or not the subject node can transition to the sleep permitted state.

When the controller 21 determines in S107 that the subject node cannot transition to the sleep permitted state, the controller 21 returns to S101 and repeats the master process. On the other hand, when the controller 21 determines in S107 that the subject node can transition to the sleep permitted state, the controller 21 proceeds to S108 and stores a fail value (i.e., a value indicating failure) in the register as a start condition. Note that S107 and S108 correspond to the processing as the sleep manager 215.

Subsequently, in S109, the controller 21 puts the microcontroller 2 in the sleep state, and then ends the master process of FIG. 6.

[1-4-4. Slave Process, FIG. 7]

Figure 7:
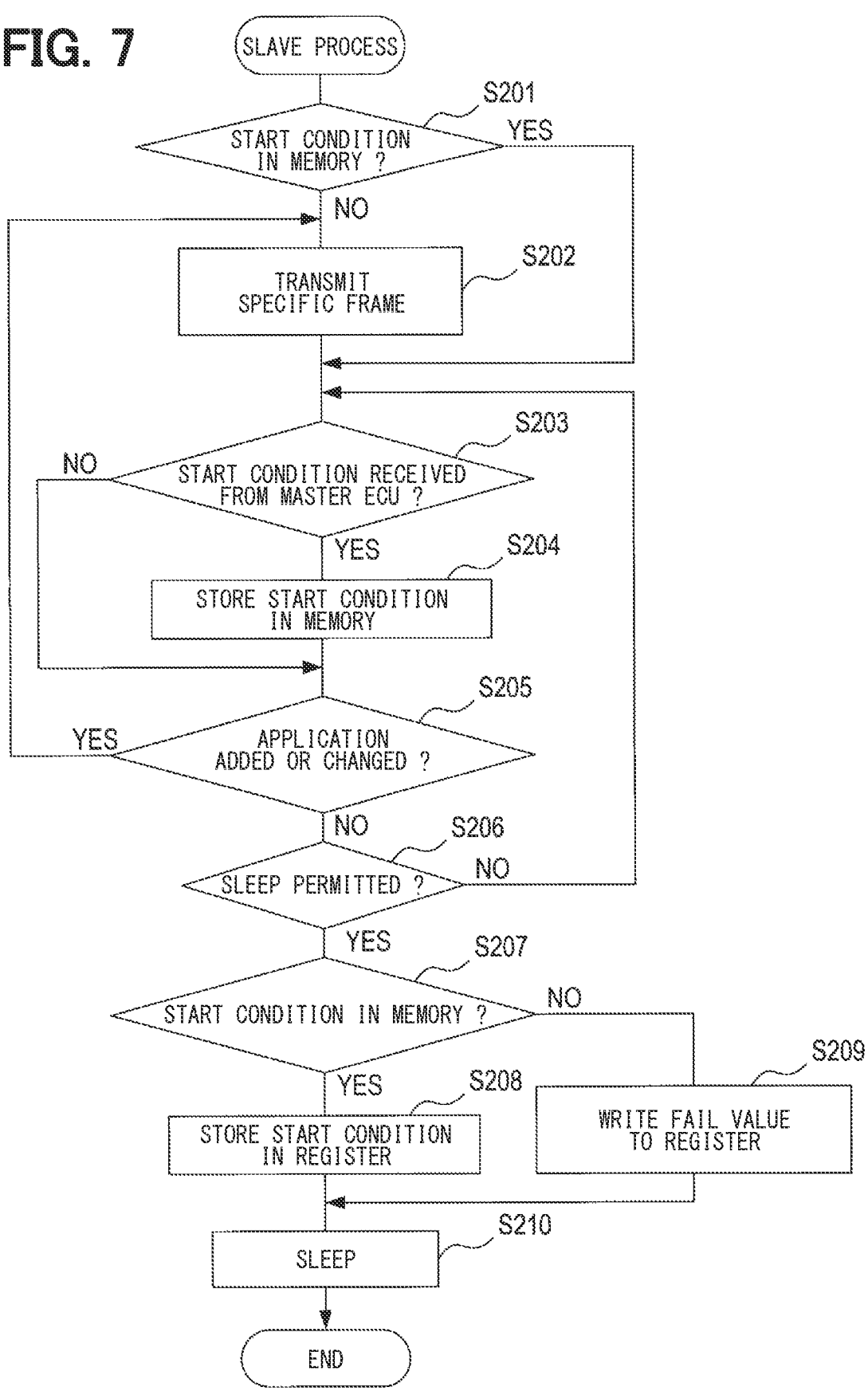
FIG. 7 is a flowchart of a slave process.

Subsequently, a slave process executed by the controllers 21 of the ECUs 1b to 1e is described with reference to a flowchart of FIG. 7. In the following description, a process by the ECU 1b is described, but the same applies to the other ECUs 1c to 1e. The slave process is started when a predetermined start condition is satisfied. In the present embodiment, the slave process is started when any of the following three start conditions is satisfied. The first is when the power supply of the ECU 1b is turned on. The second is when the ECU 1b wakes up. The third is when the ECU 1b is newly connected to the communication bus 9. The slave process is repeatedly executed at a predetermined cycle while the ECU 1b is in the normal state after the start. Thereby, for example, even if the start condition is transmitted for a plurality of times, the controller 21 can update to the latest start condition each time the start condition is transmitted.

First, in S201, the controller 21 determines whether or not the start condition is stored in a memory. When the controller 21 determines in S201 that the start condition is not stored in the memory, the controller 21 proceeds to S202, and transmits a specific frame. The specific frame transmitted at such time includes the authentication information and the node ID. In such manner, even when the start condition has never been received from the ECU 1a, or when the start condition stored in the memory disappears due to the influence of noise or the like, the start condition can be transmitted from the ECU 1a. After that, the controller 21 proceeds to S203.

On the other hand, when the controller 21 determines in S201 that the start condition is stored in the memory, the controller 21 skips S202 and proceeds to S203. Subsequently, in S203, the controller 21 determines whether or not a start condition has been newly received from the ECU 1a.

When the controller 21 determines in S203 that the start condition is newly received from the ECU 1a, the controller 21 proceeds to S204 and stores the newly received start condition from the ECU 1a in the memory. Then, the controller 21 proceeds to S205.

On the other hand, when the controller 21 determines in S203 that the start condition is not newly received from the ECU 1a, the controller 21 skips S204 and proceeds to S205.

Subsequently, in S205, the controller 21 determines whether or not there is a newly added application or a changed application in the ECU 1*b*.

When the controller 21 determines in S205 that there is an application newly added or changed in the ECU 1*b*, the controller 21 returns to S202 and transmits a specific frame. The specific frame transmitted at such time includes the authentication information and the application ID of the newly added application or the changed application. After that, the controller 21 repeats the process after S203. Note that S205 corresponds to the processing as the application confirmer 216.

On the other hand, when the controller 21 determines in S205 that there is no newly added application or changed application in the ECU 1*b*, the controller 21 proceeds to S206 and determines whether or not the subject node can transition to the sleep permitted state.

When the controller 21 determines in S206 that the subject node cannot transition to the sleep permitted state, the controller 21 returns to S203 and repeats the subsequent processing. On the other hand, when the controller 21 determines in S206 that the subject node can transition to the sleep permitted state, the controller 21 proceeds to S207 and determines whether or not the start condition is stored in the memory.

When the controller 21 determines in S207 that the start condition is stored in the memory, the controller 21 proceeds to S208 and stores, in the register, the start condition stored in the memory. On the other hand, when the controller 21 determines in S207 that the start condition is not stored in the memory, the controller 21 proceeds to S209 and stores the fail value in the register as the start condition. More specifically, the controller 21 stores the fail value in the register to wake up when "dominant" is received. This is, for example, a fail process in which, even when the controller 21 has transmitted a specific frame in S202, but has transitioned to a sleep permitted state in a situation/context where the start condition has not yet been received from the ECU 1*a* or in a similar situation. This is because if the ECU 1 transitions to the sleep state without storing the start condition in the register, it cannot wake up. Note that S204 and S206 to S209 correspond to the processing as the storage processor 217.

Subsequently, in S210, the controller 21 puts the microcontroller 2 in the sleep state, and then ends the slave process of FIG. 7.

[1-5. Effects]

According to the first embodiment described above, the following effects are achievable.

(1a) When the ECU 1*a* determines that at least one of the ECU 1 constituting the communication system 10 and the application executed by the communication system 10 has changed, the ECU 1*a* determines a start condition for each of the plurality of ECUs 1 and determines the start condition, and transmits the determined start condition to the communication bus 9. Further, the ECU 1 stores the start condition transmitted from the ECU 1*a* in the reference memory 43, and when, in the sleep state, a wake up condition is satisfied based on a comparison between the start information included in the NM frame and the start condition stored in the reference memory 43, the ECU 1, i.e., the subject node, transitions from the sleep state to the normal state. According to such a configuration, the ECU 1 can change the start condition ex post facto/post hoc by simply updating the start condition currently stored in the reference memory 43 to the start condition transmitted from the ECU 1*a*. Therefore, the start condition can be easily changed as compared with a case where the ECU 1 itself is replaced or the program is rewritten for each of the ECUs 1.

(1b) When the ECU 1*a* determines that the ECU 1 is newly connected to the communication bus 9, the ECU 1*a* determines the start condition for each of the plurality of ECUs 1. According to such a configuration, the start condition can be changed at the timing when the ECU 1 is newly connected to the communication bus 9.

(1c) When it is determined that an application is newly added or the application is changed for at least one of the plurality of ECUs 1, the ECU 1*a* determines a start condition respectively for each of the plurality of ECUs 1. According to such a configuration, the start condition can be changed at the timing when a new application is added or at the timing when the application is changed.

(1d) The ECU 1 stores the start condition in the preservation memory 22 before storing the start condition transmitted from the ECU 1*a* in the reference memory 43, and when the subject node transitions from the sleep prohibited state to the sleep permitted state, the ECU 1 stores, in the reference memory 43, the start condition stored in the preservation memory 22 before the subject node actually transitions to the sleep state. Normally, the reference memory 43 loses the start condition stored therein when electric power supplied thereto for battery backup is interrupted, but even in such a case, the ECU 1 can still write the start condition stored in the non-volatile preservation memory 22 again to the reference memory 43. Therefore, when the ECU 1 stores the start condition in the preservation memory 22 before storing it in the reference memory 43, the ECU 1 does not urge/require the ECU 1*a* to transmit the start condition again.

Further, the ECU 1 does not store the start condition in the reference memory 43 immediately after receiving the start condition, but stores the start condition immediately before the subject node actually goes into the sleep state. Therefore, the ECU 1 writes, in the reference memory 43, only the latest start condition immediately before the subject node actually goes into the sleep state. Therefore, in comparison to a configuration in which the start condition is written in the reference memory 43 every time the start condition is received regardless of whether the ECU 1 is about to transition to the sleep state, the ECU 1 of the present embodiment is enabled to reduce the number of writing of the start condition in the reference memory 43.

(1e) The ECU 1 stores the fail value as a start condition in the reference memory 43 when the start condition is not stored in the preservation memory 22 at a timing of when the start condition stored in the preservation memory 22 is stored memorized written in to the reference memory 43. According to such a configuration, even if the start condition cannot be received from the ECU 1*a* due to, for example, the failure of the ECU 1*a*, the ECU 1 can avoid a situation in which the ECU 1 cannot wake up.

Note that, in the present embodiment, the comparison circuit 44 corresponds to the processing as the starting unit.

2. Second Embodiment, FIG. 8

[2-1. Difference from First Embodiment]

Since the basic configuration and processing of the second embodiment are the same as those of the first embodiment, the common configuration and processing are omitted from the following description and the differences are mainly described.

In the first embodiment, the ECU 1*a* determines the start condition by using the avocation table held in advance and the start condition table held in advance. The node ID and the application ID are used when referring to the allocation table and the start condition table.

Here, for example, even if the vehicle is not actually connected to the communication bus 9 at the time of shipment of the vehicle, if it is assumed that the vehicle will be connected thereto in the future, the node ID the ECU 1 may be set in the allocation table and the start condition table in advance at the time of shipment of such vehicle. However, it is conceivable that an unknown ECU 1 and application that are not expected at the time of shipment of the vehicle may later be added. In such a case, in the first embodiment, since the newly added node ID and application ID are not listed in the allocation table and the start condition table held in advance, the start condition for the node ID and the application ID cannot be determined.

Figure 8:
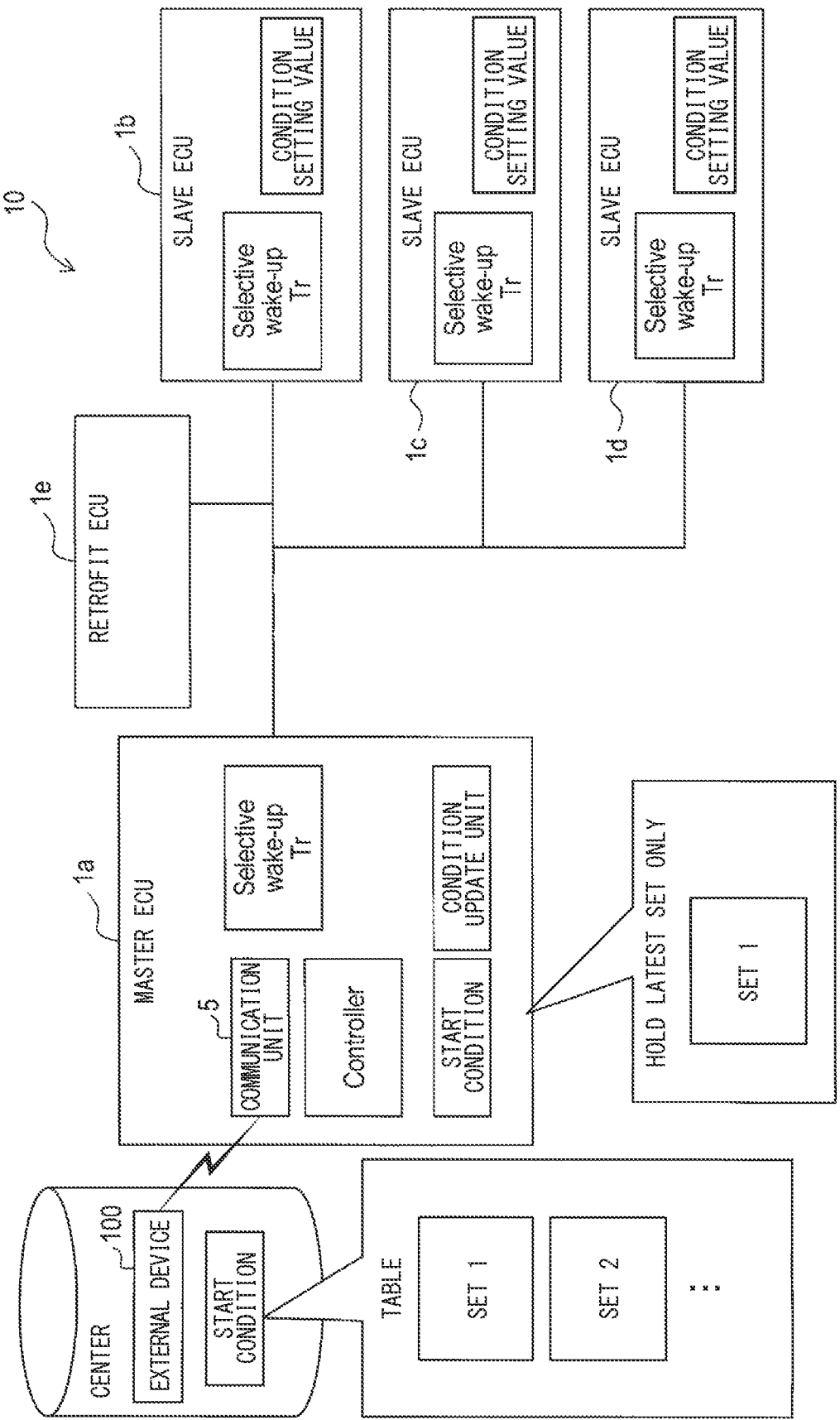
FIG. 8 is a schematic diagram showing a configuration of a communication system according to a second embodiment.

Therefore, in the second embodiment, the ECU 1a is configured so that the start condition can be acquired from the outside of the vehicle. More specifically, as shown in FIG. 8, the ECU 1a includes a communication unit 5 configured to perform wireless communication with an external device 100. In the present embodiment, the communication unit 5 is configured to perform wireless communication with the external device 100 installed in a service center. The ECU 1a receives, for example, the latest set of the allocation table and the start condition table held by the service center by OTA or the like at the timing when the ECU 1 or the application is added. If there is a set of the allocation table and the start condition table currently held, the ECU 1a overwrites the set with the latest received set. That is, the ECU 1a always holds the latest start condition.

[2-2. Effects]

(2a) The ECU 1a includes the communication unit 5 configured to perform wireless communication with the external device 100. The communication unit 5 can receive the start condition from the external device 100. According to such a configuration, for example, even when an ECU 1 or an application that is not expected at the time of shipment of the vehicle is added, the ECU 1a can acquire the start condition for the new node ID or application ID. In addition, even in such a case, the ECU 1 can acquire a new start condition from the ECU 1a without replacing the ECU 1 itself or rewriting the program for each ECU 1. Therefore, according to such a configuration, the start condition can be easily changed as compared with the configuration in which the start condition cannot be received from the external device 100.

Figure 9:
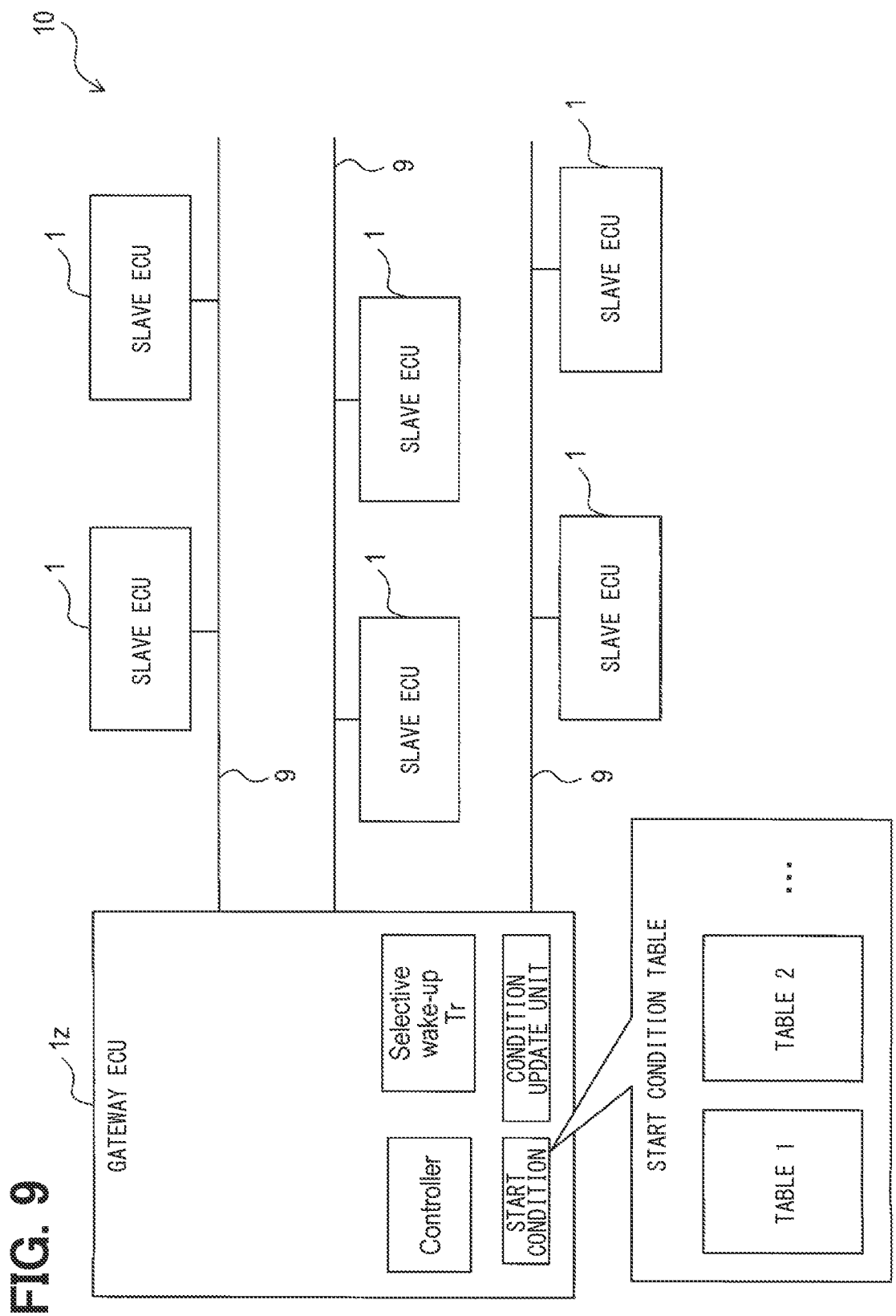
FIG. 9 is a schematic diagram showing a configuration of a communication system according to a third embodiment.

Third Embodiment, FIG. 9

[3-1. Difference from First Embodiment]

Since the basic configuration and processing of the third embodiment are the same as those of the first embodiment, the common configuration and processing is omitted from the following description, and the differences are mainly described.

In the first embodiment, as shown in FIG. 1, a plurality of ECUs 1 communicate with each other via one communication bus 9. On the other hand, in the third embodiment, as shown in FIG. 9, the communication system 10 includes a gateway ECU 1z. The gateway ECU 1z connects a plurality of communication buses 9 to each other in order to relay transmission/reception of communication frames between the plurality of ECUs 1, that is, between the plurality of nodes 1. Further, the gateway ECU 1z functions as a master ECU. That is, the gateway ECU 1z includes the determination unit 212 and the condition transmission unit 213 of the ECU 1a described above.

[3-2. Effect]

(3a) Since the gateway ECU 1z functions as the master ECU, it is possible to prevent the update of the start condition from being hindered. That is, if the master ECU is connected to any one of the plurality of communication buses 9, and the communication bus 9 becomes incommunicable due to, for example, a disconnection or a short circuit, the master ECU cannot transmit the determined start condition to any of the plurality of communication buses 9. That is, the other ECU 1 cannot update the start condition because the start condition cannot be received from the master ECU. However, if the gateway ECU 1z is provided with the function of the master ECU, even if any communication bus 9 becomes incommunicable, the determined start condition can still be transmitted to the other communication buses 9 that are not incommunicable. That is, since the ECU 1 connected to the communication bus 9 that is not incommunicable can receive the start condition, the start condition can be updated.

4. Other Embodiments

While the embodiments of the present disclosure have been described above, the present disclosure is not limited to the above embodiments and can be variously modified.

(4a) In the second embodiment, the ECU 1a receives the latest set of the allocation table and the start condition table from the service center. However, for example, the data received from the service center may be only the allocation table or only the start condition table. Further, only the data of the necessary part of the allocation table or the start condition table may also be received.

(4b) In the above embodiment, the communication system 10 is configured by one master ECU and a plurality of slave ECUs. However, the number of master ECUs and the number of slave ECUs constituting the communication system 10 are not limited to such numbers. For example, the communication system 10 may be configured to include a plurality of master ECUs or may be configured to include one slave ECU.

(4c) In the above embodiment, the master ECU, i.e., ECU 1a, determines the start condition for each of the plurality of ECUs 1 constituting the communication system 10. However, for example, the service center, that is, the server side, may determine the start condition for each of the plurality of ECUs 1. More specifically, the ECU 1a inquires of the service center by wireless communication, for example, when the retrofit ECU 1e is connected. At such time, the ECU 1a transmits the node ID of the retrofit ECU 1e received from the retrofit ECU 1e to the service center. The service center manages the configuration of the communication system 10, and determines the start condition for each of the plurality of ECUs 1 constituting the communication system 10. That is, instead of the ECU 1a, the service center holds the allocation table and the start condition table. The service center transmits the determined start condition to the ECU 1a. The ECU 1a transmits, or relays, the start condition to the communication bus 9 so that each ECU 1 receives the start condition received from the service center.

The ECU 1a may contact the service center every time the connection status of the ECU 1 constituting the communication system 10 changes or the application executed by the communication system 10 changes, or may contact the service center only when the node ID or the application ID is unknown.

(4d) In the above embodiment, when the application executed by the communication system 10 changes, the ECU 1*b* in which the new application is added or the application is changed transmits a specific frame including the authentication information and the application ID. Then, the ECU 1*a* determines whether or not the ECU 1*b* is a valid ECU 1 that is permitted to be connected based on the authentication information included in the received specific frame. However, for example, when the application executed by the communication system 10 changes, the ECU 1*b* may transmit a specific frame including the node ID and the application ID. Then, the ECU 1*a* may determine whether or not the ECU 1*b* is a valid ECU 1 for which connection is permitted, based on the node ID included in the received specific frame. This is because at this point, the ECU 1*b* has already been determined to be a valid ECU 1 for which connection is permitted based on the authentication information.

(4e) In the above embodiment, the MAC address assigned to each ECU 1 is set in the specific frame as the authentication information. However, the authentication information is not limited to such data. As the authentication information, for example, a predetermined password or code set in advance may be used. Further, in the above embodiment, the ECU 1*a* determines whether or not the ECU 1 is a valid device based on the authentication information. However, for example, the service center may determine whether or not the ECU 1 is valid based on the authentication information. In such case, for example, the ECU 1*a* transmits the authentication information received from the retrofit ECU 1*e* or the like to the service center by wireless communication, and receives the determination result from the service center.

(4f) In the above embodiment, the ECU 1*a* stores the fail value in the reference memory 43. However, for example, the start condition may be determined for the subject node in S103, and the start condition may be stored in the reference memory 43 in S108 Further, the ECU 1*a* may include the preservation memory 22, and before storing the start condition in the reference memory 43, the ECU 1*a* may store the start condition in the preservation memory 22, and upon transition of the subject node from the sleep prohibited state to the sleep permitted state, the ECU 1*a* may store, in the reference memory 43, the start condition having been stored in the preservation memory 22 before the subject node actually transition to the sleep state.

(4g) In the above embodiment, a non-volatile memory is used as the preservation memory 22. However, the type of memory is not limited to the above. As the preservation memory 22, for example, a battery backup RAM may also be used.

(4h) In the above embodiment, the communication system 10 communicates according to the CAN protocol. However; the communication protocol is not limited to the above, and other communication protocols may also be used.

(4i) The functions of one component in the above embodiment may be divided and distributed as a plurality of components, or the functions of the plurality of components may be integrated into one component. Moreover, the configuration of the above embodiment may be in part omitted. At least a part of the configuration of the embodiment described above may be added to, or replaced with another configuration of the embodiment described above.

What is claimed is:

1. A communication system in which a plurality of nodes communicate with each other according to a communication protocol, which wakes up a part of the plurality of nodes when a communication frame containing specific start information occurs on or is transmitted to a communication bus, the communication system comprising:
   a plurality of nodes including at least one master node and at least one slave node, wherein
   the at least one master node includes a processor and a memory to provide a determination unit and a condition transmission unit,
   the determination unit is configured to determine a start condition, which is a condition for transitioning from a sleep state to a normal state for the at least one slave node when it is determined that at least one of (a) the nodes constituting the communication system and (b) an application executed by the communication system has changed,
   the condition transmission unit is configured to transmit the start condition determined by the determination unit to the communication bus,
   the processor and the memory of the least one master node also provide a storage processor and a start unit,
   the storage processor is configured to store the start condition transmitted from the at least one master node in a reference memory,
   the start unit is configured to let a subject node transition from the sleep state to the normal state when (A) the start unit compares, in the sleep state, the start information included in the communication frame with the start condition stored in the reference memory, and (B) a wakeup condition is satisfied, and
   the storage processor is configured to store the start condition in a preservation memory that is a storage area different from the reference memory before storing the start condition transmitted from the at least one master node in the reference memory.

2. The communication system of claim 1, wherein
   the determination unit determines the start condition for the at least one slave node when it is determined that a node is newly connected to the communication bus.

3. The communication system of claim 1, wherein
   the determination unit determines the start condition for the at least one slave node when it is determined that an application has been newly added or changed for at least one of the plurality of nodes.

4. The communication system of claim 1, wherein
   when the subject node transitions from (i) a sleep prohibited state in which transition to the sleep state is prohibited to (ii) a sleep permitted state in which transition to the sleep state is permitted, the storage processor stores, in the reference memory, the start condition that is stored in the preservation memory before the subject node actually transitions to the sleep state.

5. The communication system of claim 4, wherein at a timing when the start condition stored in the preservation memory is stored in the reference memory, if the start condition is not stored in the preservation memory, the storage processor stores, in the reference memory as the start condition, a fail value that causes the subject node to transition from the sleep state to the normal state upon receiving the communication frame containing arbitrary start information.

6. The communication system of claim 1, wherein
the at least one master node is provided with a communication unit configured to perform wireless communication with an external device, and
the communication unit is capable of receiving the start condition from the external device.
7. The communication system of claim 1, wherein
at least one gateway, being a node that relays the communication frame among the plurality of nodes, functions as the at least one master node.
8. The communication system of claim 1, wherein
the preservation memory is a non-volatile memory.

\* \* \* \* \*